(12) United States Patent
Reimann et al.

(10) Patent No.: US 11,527,910 B2
(45) Date of Patent: Dec. 13, 2022

(54) UNINTERRUPTIBLE POWER SUPPLY

(71) Applicant: FLUENCE ENERGY, LLC, Arlington, VA (US)

(72) Inventors: Oliver Reimann, Erlangen (DE); Johannes Reinschke, Nuremberg (DE)

(73) Assignee: Fluence Energy, LLC, Arlington, VA (US)

( * ) Notice: Subject to any disclaimer, the term of this patent is extended or adjusted under 35 U.S.C. 154(b) by 0 days.

(21) Appl. No.: 16/628,759

(22) PCT Filed: Jun. 21, 2018

(86) PCT No.: PCT/EP2018/066504
§ 371 (c)(1),
(2) Date: Jan. 6, 2020

(87) PCT Pub. No.: WO2019/007691
PCT Pub. Date: Jan. 10, 2019

(65) Prior Publication Data
US 2020/0295594 A1   Sep. 17, 2020

(30) Foreign Application Priority Data
Jul. 4, 2017  (DE) ............................ 102017211351

(51) Int. Cl.
*H02J 9/06* (2006.01)
*H02J 3/32* (2006.01)
(Continued)

(52) U.S. Cl.
CPC ........... *H02J 9/062* (2013.01); *H02H 1/0007* (2013.01); *H02H 7/28* (2013.01); *H02J 3/32* (2013.01)

(58) Field of Classification Search
CPC ...... H02J 9/062; H02J 3/32; H02J 7/00; H02J 7/0063; H02J 3/16; H02H 1/0007;
(Continued)

(56) References Cited

U.S. PATENT DOCUMENTS 5,747,887 A    5/1998  Takanaga et al.
2005/0012395 A1  1/2005  Eckroad et al.
(Continued)

FOREIGN PATENT DOCUMENTS

DE    409279 C    2/1925
DE    4422265 A1   1/1996
(Continued)

*Primary Examiner* — Lincoln D Donovan
*Assistant Examiner* — Alex W Lam
(74) *Attorney, Agent, or Firm* — RatnerPrestia (57) ABSTRACT

An uninterruptible power supply (UPS) for a three-phase alternating current network, in particular a medium-voltage network, includes an energy storage system, a switch, an LC resonant circuit, which is a series circuit of an inductance and a capacitance, and a control unit for controlling the switch. The switch and the LC resonant circuit are connected in series, and the series circuit of the switch and the LC resonant is arranged between a network feed and the energy storage system which is connected to a load. There is also described a method for operating such a UPS and a corresponding computer program.

18 Claims, 7 Drawing Sheets

(51) Int. Cl.
*H02H 1/00* (2006.01)
*H02H 7/28* (2006.01)

(58) Field of Classification Search
CPC ............ H02H 7/28; H02H 3/253; H02H 7/26; H02M 7/523
See application file for complete search history.

(56) References Cited

U.S. PATENT DOCUMENTS

| | | |
|---|---|---|
| 2008/0034256 A1 | 2/2008 | Mosman |
| 2008/0136374 A1* | 6/2008 | Nelson ................. B60L 58/33 320/167 |
| 2012/0019203 A1* | 1/2012 | Kressner ............... B60L 53/63 320/109 |
| 2016/0013728 A1* | 1/2016 | Giuntini ............... H02M 5/458 307/66 |
| 2016/0181864 A1 | 6/2016 | Reddy et al. |
| 2017/0077746 A1* | 3/2017 | Kanakasabai ........... H02J 7/007 |
| 2017/0117748 A1 | 4/2017 | Mondal |
| 2020/0136390 A1 | 4/2020 | Eckert et al. |
| 2020/0295594 A1 | 9/2020 | Reimann et al. |
| 2021/0257835 A1 | 8/2021 | Eckert et al. |

FOREIGN PATENT DOCUMENTS

| | | |
|---|---|---|
| DE | 102011089851 A1 | 6/2012 |
| DE | 102017211351 A1 | 1/2019 |
| DE | 102017211355 A1 | 1/2019 |
| DE | 102017211356 A1 | 1/2019 |
| JP | 2002320331 A | 10/2002 |
| WO | WO2006010725 A1 | 2/2006 |
| WO | WO2007055587 A1 | 5/2007 |
| WO | WO2016025566 A2 | 2/2016 |

* cited by examiner

UNINTERRUPTIBLE POWER SUPPLY

BACKGROUND OF THE INVENTION

Field of the Invention

The invention relates to an electrical energy storage system connected to a three-phase AC voltage grid, in particular to a medium-voltage grid. A modular energy storage system from Siemens AG is known for example under the name "SIESTORAGE" (www.siemens.de/siestorage).

Such an energy storage system may be used both for a voltage-independent (or line-interactive) uninterruptible power supply (UPS) and to stabilize the voltage in a medium-voltage power chain. The purpose of an uninterruptible power supply is to protect loads (also referred to as "critical loads") from excessively large grid voltage fluctuations (that is to say excessively large deviations in the fundamental voltage amplitude, the fundamental frequency and/or the harmonics of the respective nominal values).

The European guidelines of the ZVEI (German electrical and electronics industry) compile uninterruptible power supplies (cf.: http://www.zvei.org/Publikationen). Reference is additionally made to the EN 62040-3 standard, in which uninterruptible power supplies are also referred to as "topology in parallel with the grid".

SUMMARY OF THE INVENTION

The object of the invention is to provide an efficient uninterruptible power supply for a medium-voltage grid.

This object is achieved according to the features of the independent claims. Preferred embodiments are able to be inferred in particular from the dependent claims.

In order to achieve the object, what is proposed is an uninterruptible power supply for a three-phase AC voltage grid, in particular a medium-voltage grid,
  having an energy storage system,
  having a switch,
  having an LC resonant circuit that comprises a series circuit consisting of an inductor and a capacitor,
  having an actuation unit for actuating the switch,
  wherein the switch and the LC resonant circuit are connected in series, and wherein the series circuit consisting of the switch and LC resonant circuit is arranged between a grid supply and the energy storage system that is connected to a load.

One development is that the actuation unit detects a grid fault with the grid supply via a current measurement or voltage measurement and opens the switch in response.

One development is that a bypass switch is arranged in parallel with the LC resonant circuit, wherein the bypass switch is able to be actuated by the actuation unit or by the energy storage system.

One development is that the bypass switch is closed if the energy storage system is not operational.

One development is that the bypass switch is a medium-voltage switch.

One development is that the resonant frequency of the LC resonant circuit is determined substantially by the frequency of the grid supply.

One development is that the resonant frequency of the LC resonant circuit is 50 Hz or 60 Hz.

One development is that the quality of the LC resonant circuit is configured such that the settling time of the LC resonant circuit is substantially 1 second or lies in a range between 1 second and 10 seconds.

One development is that the switch is a medium-voltage switch.

One development is that the medium-voltage grid is a three-phase grid, wherein each of the phases has a voltage of at least 1000 volts, in particular a voltage in a range between 1 kV and 52 kV.

What is also proposed is a method for operating an uninterruptible power supply in a three-phase AC voltage grid, in particular a medium-voltage grid,
  in which a load is operated during normal operation via a grid supply that is connected to the load via a series circuit consisting of an LC resonant circuit and a switch, wherein the LC resonant circuit comprises a series circuit consisting of an inductor and a capacitor,
  in which, in the event of a grid fault
  the grid supply is disconnected from the load by opening the switch by way of an actuation unit, and
  the load is operated via an energy storage system.

The explanations with regard to the device, in particular the uninterruptible power supply, apply accordingly to the other categories of claims.

The solution proposed here furthermore comprises a computer program product that is able to be loaded directly into a memory of a digital computer, comprising program code portions that are suitable for performing steps of the method described here.

The abovementioned problem is furthermore solved by way of a computer-readable storage medium, for example any desired memory, comprising instructions able to be executed by a computer (for example in the form of program code) and that are suitable for the computer to perform steps of the method described here.

The processing unit mentioned here may in particular be designed as a processor unit and/or an at least partly hardwired or logic circuit arrangement that is configured for example such that the method as described herein is able to be performed. Said processing unit may be or comprise any type of processor or computer having accordingly required peripherals (memory, input/output interfaces, input/output devices, etc.).

The above explanations with regard to the method apply accordingly to the device. The device may be implemented in one component or distributed in a plurality of components.

The above-described properties, features and advantages of this invention and the way in which they are achieved will become clearer and more clearly comprehensible in connection with the following schematic description of exemplary embodiments that are explained in more detail in connection with the drawings. In this case, identical or functionally identical elements may be provided with the same reference signs for the sake of clarity.

DESCRIPTION OF THE INVENTION

Figure 1:
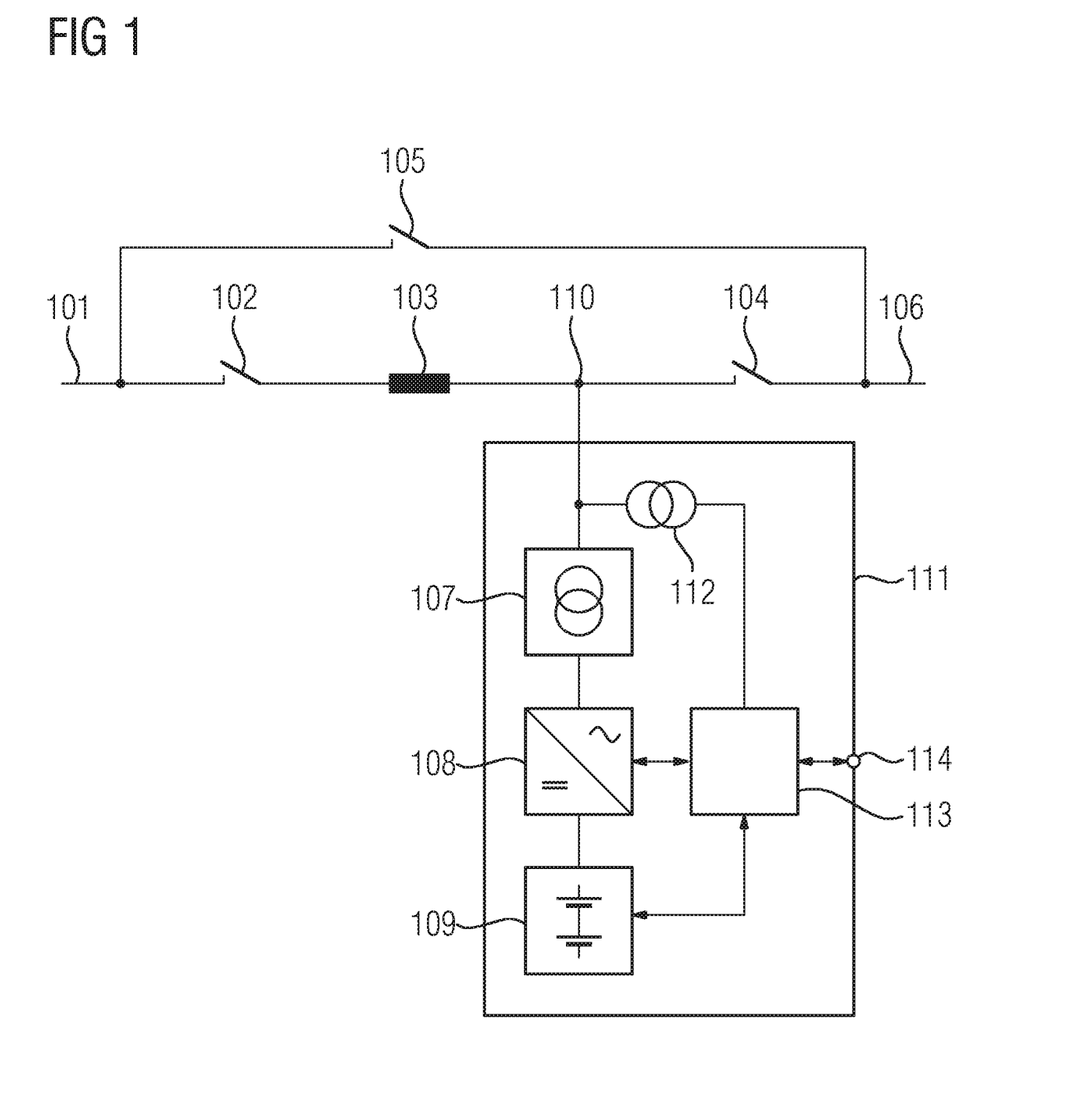
FIG. 1 shows an overview of a medium-voltage UPS installation.

FIG. 1 shows an overview of a medium-voltage UPS installation. A main supply 101 is connected to a node 110 via an interrupt switch 102 and an inductor 103. The node 110 is connected to an output 106 via an interrupt switch 104, to which output a critical load (this not being illustrated in FIG. 1) is able to be connected.

The main supply 101 may be connected directly to the output 106 by way of a bypass switch 105. The bypass switch 105 is open during normal operation (that is to say without further actuation) (that is also referred to as "NO" for "normally open") and then does not permit any direct flow of current from the main supply 101 to the output 106.

An energy store 109 is connected to the node 110 via a power converter 108 and a coupling transformer 107. The power converter 108 converts the DC voltage from the energy store 109 into an AC voltage and vice versa.

The energy store 109, the power converter 108 and the coupling transformer 107 may be referred to as an energy storage system 111 or part of an energy storage system. The energy storage system 111 may be for example a SIESTORAGE system or part of a SIESTORAGE system.

The energy storage system 111 may additionally optionally have a control unit 113 that is able to detect the voltage at the input of the energy storage system 111 via a voltage measurement 112. The control unit 113 may have for example an interface with the power converter 108 and/or an interface with the energy store 109. The control unit 113 may be implemented for example in the form of a BESS controller (BESS: large battery energy storage system). The energy storage system 111 may furthermore have an interface 114 to an external superordinate control unit (not illustrated in FIG. 1) (for example what is known as a supervisory controller).

It is thus an option for the energy store 109 to be able to support the voltage without the interrupt switch being opened: the voltage at the node 110 is recorded by way of the voltage measurement 112, and the control unit 113 may be used to attempt to regulate this voltage to a nominal value.

An electric voltage having a value of for example 6 kV to 30 kV (in the form of a three-phase AC current) is provided via the main supply 101.

The critical load connected to the output 106 is thus protected against fluctuations of the nominal profile of the voltage of the main supply 101 by the energy store 109.

During fault-free operation, the critical load connected to the output 106 is supplied via the main supply 101 and the inductor 103, wherein the energy storage system 111 is able to compensate the reactive power required by the inductor 103 (or the inductive voltage drop).

If a grid fault or a voltage dip occurs on the main supply 101, this is able to be detected by an actuation unit (not illustrated in FIG. 1). As a result, the actuation unit is accordingly able to open the interrupt switch 102 (for example for a particular period of time). If the interrupt switch 102 is opened, then the electrical connection between the main supply 101 and the output 106 is interrupted. The critical load at the output 106 is however then able to be supplied by the energy supply system 111.

It is pointed out here that the interrupt switches 102, 104 are closed during normal operation (that is to say without any other actuation). This is also referred to as "NC" (for "normally closed").

The dimensioning of the energy storage system 111 determines how long the critical load is able to be supplied with electrical energy via the output 106 without a connection to the main supply 101. By way of example, the energy storage system may be dimensioned such that grid faults or voltage dips over a duration of a few milliseconds up to several minutes are compensated.

The arrangement shown in FIG. 1 thus provides a medium-voltage UPS that is able to respond quickly and flexibly to grid faults or voltage dips with the main supply 101. It is pointed out here that a connection to a low voltage is also possible.

A multiplicity of variants of a topology of the medium-voltage UPS in parallel with the grid are possible. A few examples are explained in more detail below. For example, voltage detection arranged on the supply side of the interrupt switch 102 is in particular provided, by way of which voltage detection an undervoltage is able to be detected in the main supply 101, and the interrupt switch 102 is able to be opened as a result.

Variant 1: Single Busbar

Figure 2:
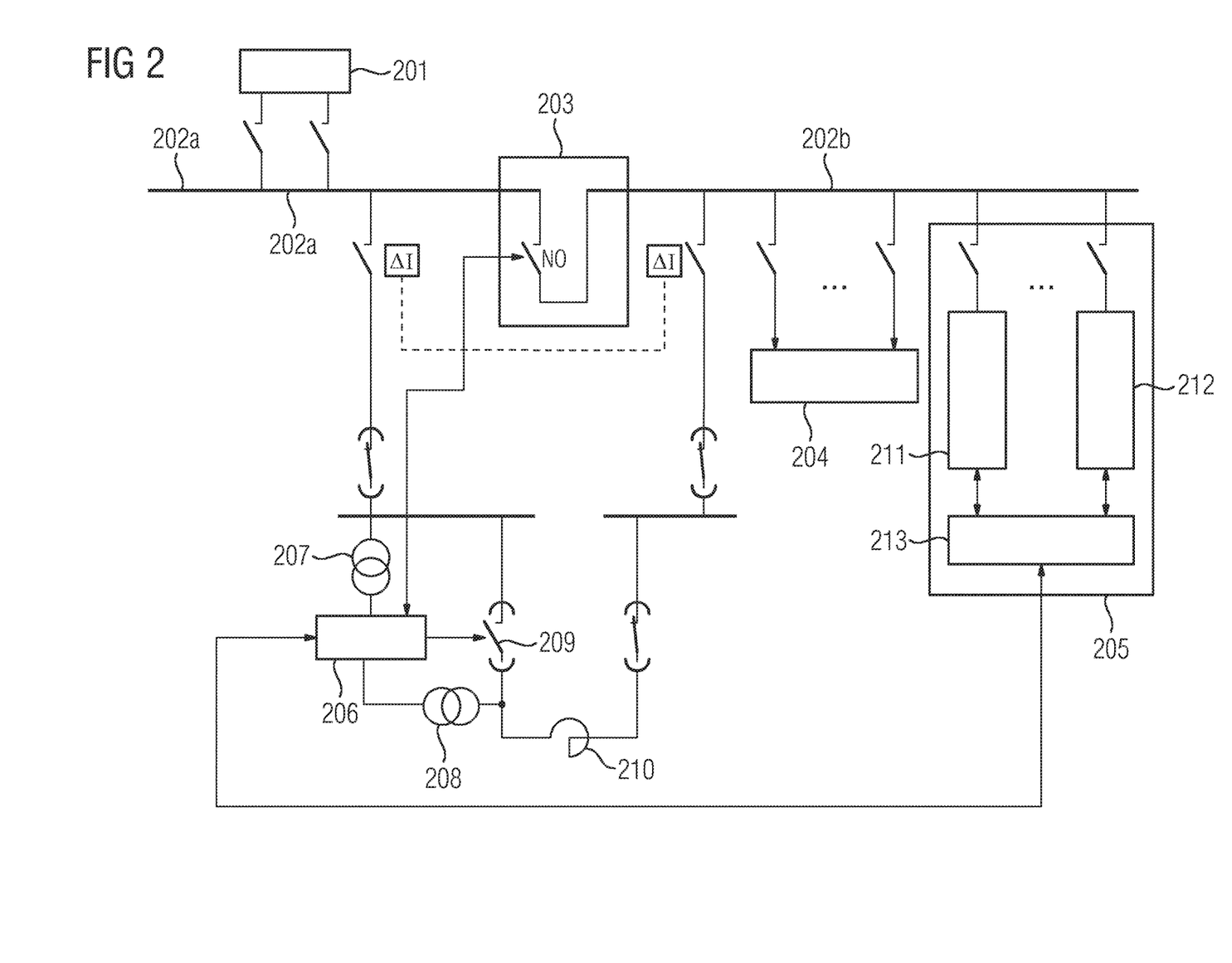
FIG. 2 shows an exemplary arrangement for a medium-voltage UPS having a single busbar (also referred to as conductor rail), wherein the critical load and the energy storage system are connected jointly to this busbar.

FIG. 2 shows an exemplary arrangement for a medium-voltage UPS. A main supply 201 (redundant via two lines) is connected to a single busbar 202a. The busbar 202a is able to be connected to a busbar 202b via a bypass circuit 203. The bypass circuit 203 has a switch that is open during normal operation (NO: "normally open").

The busbar 202a is connected to the busbar 202b via a series circuit comprising an interrupt switch 209 and an inductor 210 (choke).

A load 204 and an energy storage system 205 are connected to the busbar 202b.

The energy storage system 205 may have a multiplicity of energy storage subsystems 211, 212 that are connected to a control unit 213. Each of the energy storage subsystems 211, 212 is electrically connected (or able to be connected) to the load.

In the example shown in FIG. 2, each of the energy storage subsystems 211, 212 is connected to the busbar 202b.

It is noted here that all of the switches shown in FIG. 2 except for the switch of the bypass circuit 203 are closed without any other actuation (NC).

An actuation unit 206 is electrically connected to the busbar 202a, and a voltage measurement 207 allows the actuation unit 206 to detect whether a grid fault is present and the main supply 201 should be disconnected from the load 204. If this is the case, then the actuation unit 206 trips the interrupt switch 209 (that is to say the interrupt switch 209 is opened).

The voltage measurement 208 is optional for re-synchronizing and re-closing the interrupt switch 209. The voltage measurement 208 may for example be dispensed with if the energy storage system 205 has a voltage measurement at the connection to the busbar 202b. If no current flows through the inductor 210, then this voltage measurement of the energy storage system 205 delivers (substantially) the same measured value as the voltage measurement 208. The result of the voltage measurement of the energy storage system may be provided by the control unit 213 of the actuation unit 206.

The bypass circuit 203 is preferably closed when the energy storage system 205 is partly or fully switched off or fails, because in this case it is no longer possible to ensure the reactive power compensation of the inductor 210.

By way of example, a monitoring system (for example a SCADA system, that is to say control station) communicates with the control unit 213 in order to close the bypass circuit 203. It is also possible for the control unit 213 to independently detect that the bypass circuit 203 should be closed. In this case, the communication takes place from the control unit 213 to the bypass circuit 203 via the actuation unit 206.

During fault-free operation, the load 204 is thus operated via the main supply 201. In this case, the current flows to the busbar 202b, and thus to the load 204 and the energy storage system 205, via the busbar 202a through the series circuit consisting of the interrupt switch 209 and inductor 210.

If a grid fault or a voltage dip occurs on the main supply 201, this is able to be detected by the actuation unit 206 and the interrupt switch 209 is able to be opened accordingly (for example for a particular period of time). If the interrupt switch 209 is opened, then the electrical connection between the main supply 201 and the load 204 is interrupted. The load 204 may however then be supplied with electrical energy by means of the energy storage system 205.

Variant 2: Single Busbar—An Alternative

Figure 3:
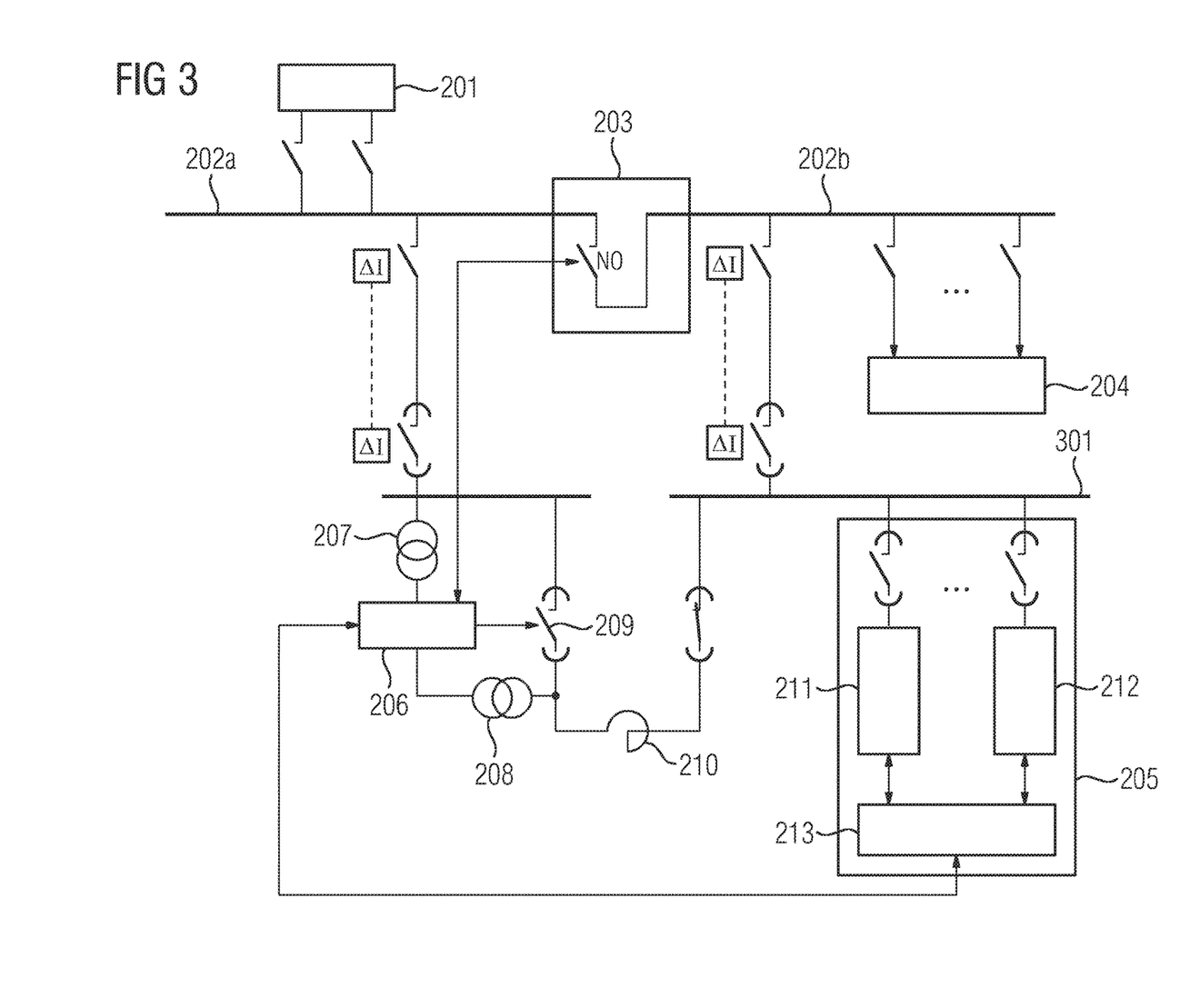
FIG. 3 shows an alternative arrangement for a medium-voltage UPS having a single busbar, wherein the critical load and the energy storage system are connected jointly to different busbars.

FIG. 3 shows an alternative to the embodiment shown in FIG. 2. Unlike FIG. 2, the energy storage system in FIG. 3 is not connected to the busbar 202b, but rather to a busbar 301 that is arranged between the inductor 210 and the busbar 202b.

Variant 3: Single Busbar, a Plurality of Loads

Figure 4:
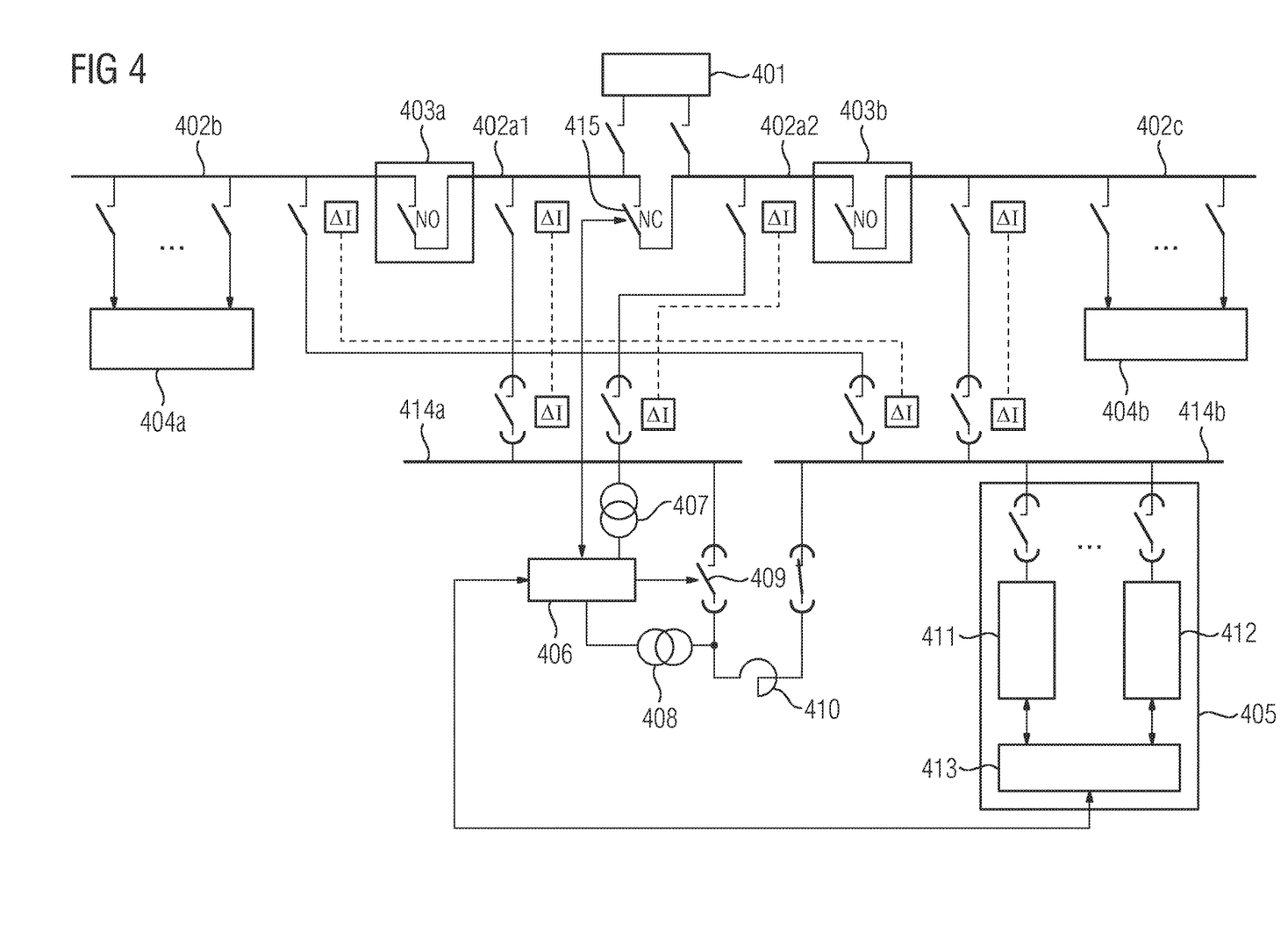
FIG. 4 shows another arrangement for a medium-voltage UPS having a plurality of loads that are connected to a plurality of single busbars (conductor rails)

FIG. 4 shows a further exemplary arrangement for a medium-voltage UPS. A main supply 401 has two redundant lines, wherein one of the lines is connected to a busbar 402a1 and the other of the lines is connected to a busbar 402a2.

The busbar 402a1 is connected to the busbar 402a2 via a switch 415, wherein the switch 415 is closed without further actuation (that is to say in the normal mode) (NC).

The busbar 402a1 is able to be connected to a busbar 402b via a bypass circuit 403a. The busbar 402a2 is furthermore able to be connected to a busbar 402c via a bypass circuit 403b. The bypass circuits 403a and 403b each have a switch that is open during normal operation (NO).

The busbar 402a1 and the busbar 402a2 are connected to a busbar 414a. The busbar 414a is connected to a busbar 414b via a series circuit comprising an interrupt switch 409 and an inductor 410 (choke). The busbar 414b is connected to the busbar 402b and to the busbar 402c.

A load 404a is connected to the busbar 402b and a load 404b is connected to the busbar 402c. An energy storage system 405 is connected to the busbar 414b.

The energy storage system 405 may have a multiplicity of energy storage subsystems 411, 412 that are connected to a control unit 413. Each of the energy storage subsystems 411, 412 is electrically connected (or able to be connected) to the load 404a, 404b.

In the example shown in FIG. 4, each of the energy storage subsystems 411, 412 is connected to the busbar 414b.

It is noted here that all of the switches shown in FIG. 4 except for the switch of the bypass circuits 403a, 403b are closed without any other actuation (NC).

An actuation unit 406 is electrically connected to the busbars 402a1 and 402a2, and a voltage measurement 407 allows the actuation unit 406 to detect whether a grid fault is present and the main supply 401 should be disconnected from the two loads 404a, 404b. If this is the case, then the actuation unit 406 trips the interrupt switch 409 (that is to say the interrupt switch 409 is opened).

The statements made above under FIG. 2 with regard to the voltage measurement 208 apply accordingly to the voltage measurement 408.

It is also an option for the actuation unit 406 to actuate the normally closed bypass circuits 403a and 403b.

During fault-free operation, the loads 404a and 404b are operated via the main supply 401. In this case, the current flows via the busbars 402a1, 402a2, further via the busbar 414a through the series circuit consisting of the interrupt switch 409 and inductor 410, to the busbar 414b and thus to the energy storage system 405. From the busbar 414b, the current flows both to the busbar 402b and the load 404a and to the busbar 402c and the load 404b.

If a grid fault or a voltage dip occurs on the main supply 401, this is able to be detected by the actuation unit 406 and the interrupt switch 409 is able to be opened accordingly (for example for a particular period of time). If the interrupt switch 409 is opened, then the electrical connection between the main supply 401 and the loads 404a, 404b is interrupted. The loads 404a and 404b may however then be supplied with electrical energy by means of the energy storage system 405.

Variant 4: Double Busbar

Figure 5:
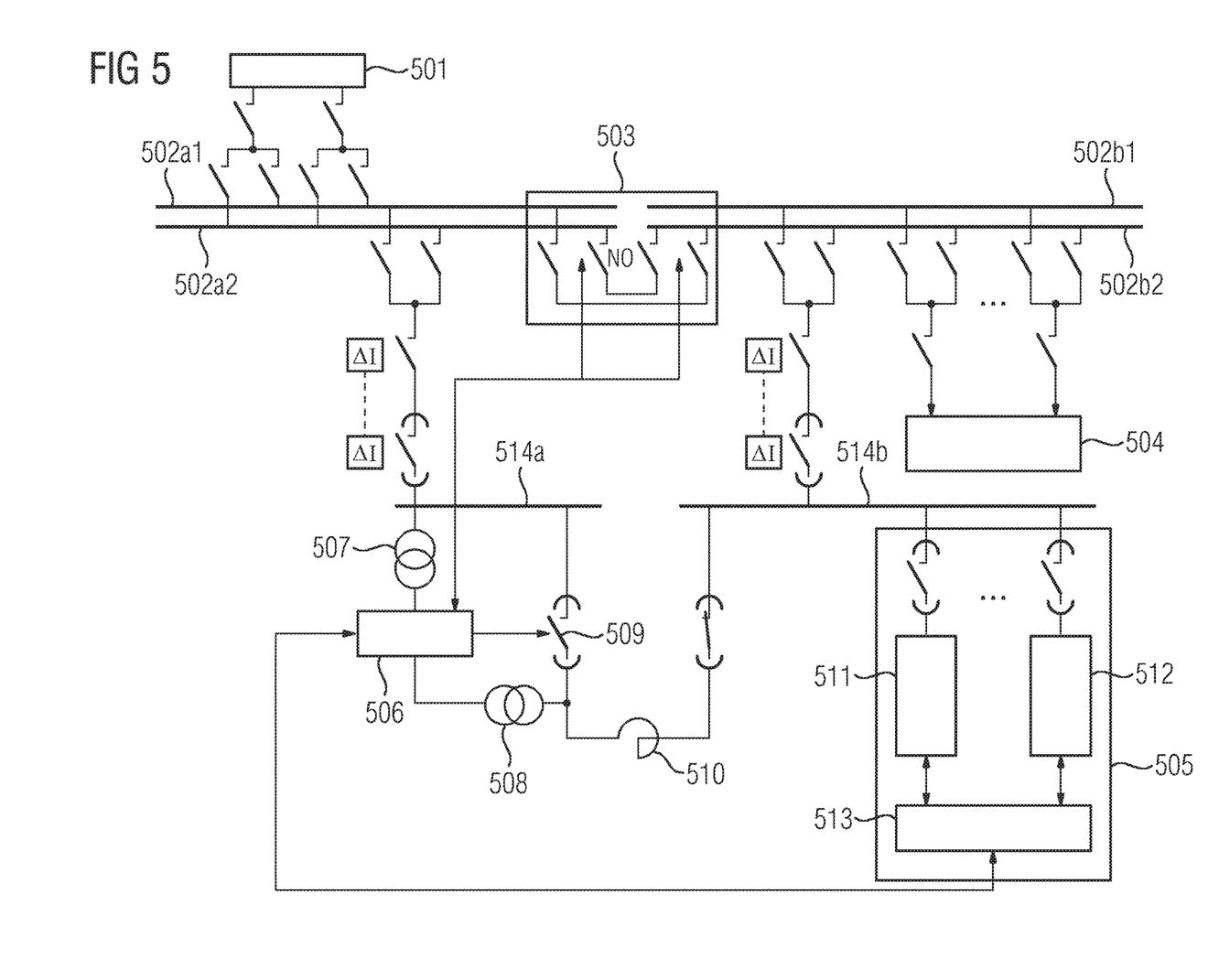
FIG. 5 shows an exemplary arrangement for a medium-voltage UPS having at least one critical load on a double busbar.

FIG. 5 shows a further exemplary arrangement for a medium-voltage UPS. A main supply 501 has two redundant lines, wherein each of the redundant lines is connected to a busbar 502a1 and to a busbar 502a2.

The busbar 502a1 is able to be connected to a busbar 502b1 and the busbar 502a2 is able to be connected to a busbar 502b2 by way of a bypass circuit 503. For this purpose, the bypass circuit 503 has a plurality of switches that are each open (NO) during normal operation (that is to say without any further actuation).

The busbar 502a1 and the busbar 502a2 are connected to a busbar 514a. The busbar 514a is connected to a busbar 514b via a series circuit comprising an interrupt switch 509 and an inductor 510 (choke). The busbar 514b is connected to the busbar 502b1 and to the busbar 502b2.

A load 504 is connected to the busbar 502b1 and to the busbar 502b2. An energy storage system 505 is connected to the busbar 514b.

The energy storage system 505 may have a multiplicity of energy storage subsystems 511, 512 that are connected to a control unit 513. Each of the energy storage subsystems 511, 512 is electrically connected (or able to be connected) to the load 504.

In the example shown in FIG. 5, each of the energy storage subsystems 511, 512 is connected to the busbar 514b.

It is noted here that all of the switches shown in FIG. 5 except for the switches of the bypass circuit 503 are closed without any other actuation (NC).

An actuation unit 506 is electrically connected to the busbars 502a1 and 502a2, and a voltage measurement 507 allows the actuation unit 506 to detect whether a grid fault is present and the main supply 501 should be disconnected from the load 504. If this is the case, then the actuation unit 506 trips the interrupt switch 509 (that is to say the interrupt switch 509 is opened).

The statements made above under FIG. 2 with regard to the voltage measurement 208 apply accordingly to the voltage measurement 508.

It is also an option for the actuation unit 506 to actuate (close) the normally closed switches of the bypass circuit 503. As a result, it is possible to achieve a situation whereby the UPS circuit comprising the interrupt switch 509 and the inductor 510 as well as the energy store 505 is bypassed.

During fault-free operation, the load 504 is operated via the main supply 501. In this case, the current flows via the busbars 502a1, 502a2, further via the busbar 514a through the series circuit consisting of the interrupt switch 509 and inductor 510, to the busbar 514b and thus to the energy storage system 505. From the busbar 514b, the current flows to the load 504 via the busbars 502b1 and 502b2.

If a grid fault or a voltage dip occurs on the main supply 501, this is able to be detected by the actuation unit 506 and the interrupt switch 509 is able to be opened accordingly (for example for a particular period of time). If the interrupt switch 509 is opened, then the electrical connection between the main supply 501 and the load 504 is interrupted. The load 504 may however be supplied with electrical energy by means of the energy storage system 505 in this case.

Variant 5: Double Busbar—An Alternative

Figure 6:
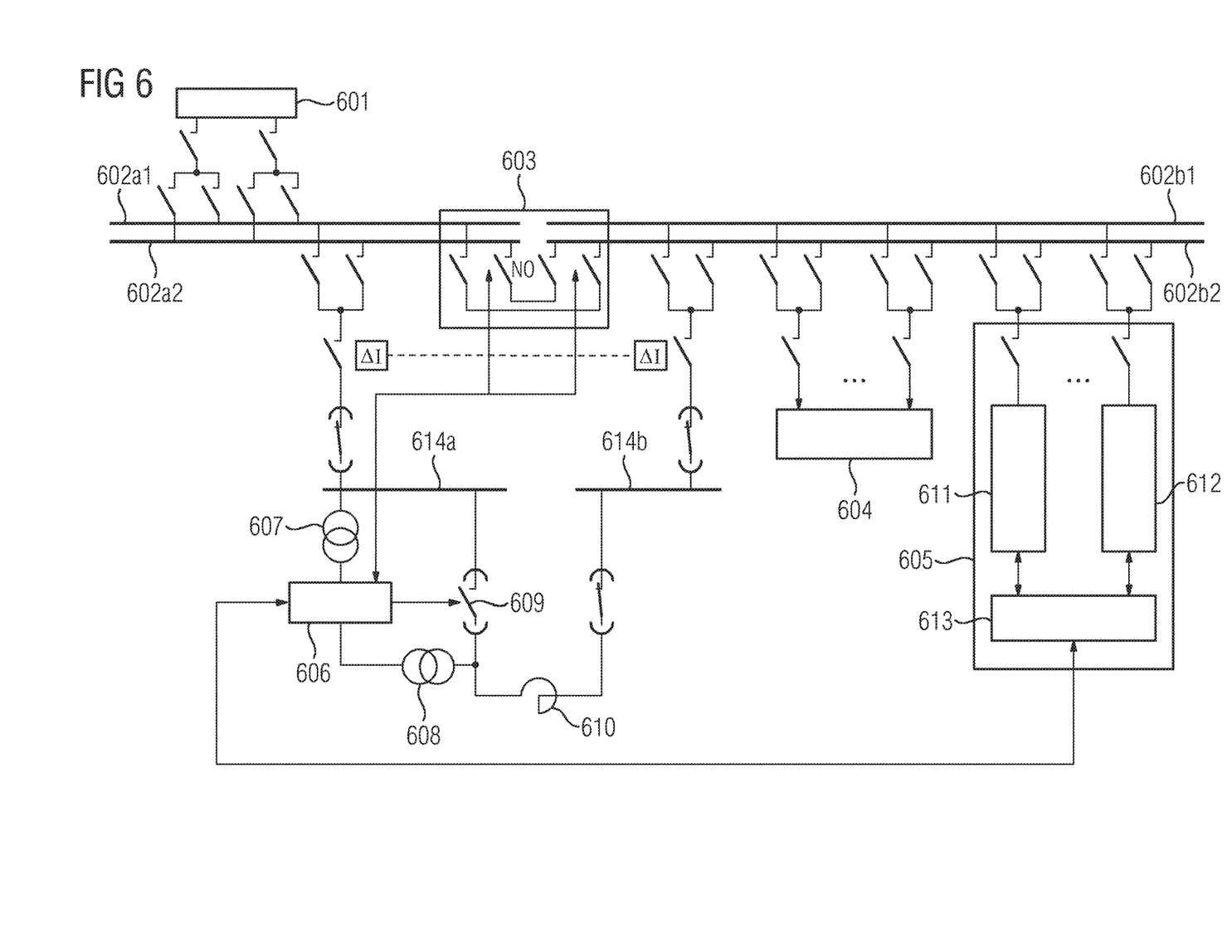
FIG. 6 shows a further exemplary arrangement for a medium-voltage UPS having at least one critical load on a double busbar.

FIG. 6 shows a further exemplary arrangement for a medium-voltage UPS. A main supply 601 has two redundant lines, wherein each of the redundant lines is connected to a busbar 602a1 and to a busbar 602a2.

The busbar 602a1 is able to be connected to a busbar 602b1 and the busbar 602a2 is able to be connected to a busbar 602b2 by way of a bypass circuit 603. For this purpose, the bypass circuit 603 has a plurality of switches that are each open (NO) during normal operation (that is to say without any further actuation).

The busbar 602a1 and the busbar 602a2 are connected to a busbar 614a. The busbar 614a is connected to a busbar 614b via a series circuit comprising an interrupt switch 609 and an inductor 610 (choke). The busbar 614b is connected to the busbar 602b1 and to the busbar 602b2.

A load 604 and an energy storage system 605 are connected to the busbar 602b1 and to the busbar 602b2.

The energy storage system 605 may have a multiplicity of energy storage subsystems 611, 612 that are connected to a control unit 613. Each of the energy storage subsystems 611, 612 is electrically connected (or able to be connected) to the load 604.

In the example shown in FIG. 6, each of the energy storage subsystems 611, 612 is connected both to the busbar 602b1 and to the busbar 602b2.

It is noted here that all of the switches shown in FIG. 6 except for the switches of the bypass circuit 603 are closed without any other actuation (NC).

An actuation unit 606 is electrically connected to the busbars 602a1 and 602a2, and a voltage measurement 607 allows the actuation unit 606 to detect whether a grid fault is present and the main supply 601 should be disconnected from the load 604. If this is the case, then the actuation unit 606 trips the interrupt switch 609 (that is to say the interrupt switch 609 is opened).

The statements made above under FIG. 2 with regard to the voltage measurement 208 apply accordingly to the voltage measurement 608.

It is also an option for the actuation unit 606 to actuate (close) the normally closed switches of the bypass circuit 603. As a result, it is possible to achieve a situation whereby the UPS circuit comprising the interrupt switch 609 and the inductor 610 are bypassed.

During fault-free operation, the load 604 is operated via the main supply 601. In this case, the current flows via the busbars 602a1, 602a2, further via the busbar 614a through the series circuit consisting of the interrupt switch 609 and inductor 610, to the busbar 614b. From the busbar 614b, the current flows to the load 604 and to the energy storage system 605 via the busbars 602b1 and 602b2.

If a grid fault or a voltage dip occurs on the main supply 601, this is able to be detected by the actuation unit 606 and the interrupt switch 609 is able to be opened accordingly (for example for a particular period of time). If the interrupt switch 609 is opened, then the electrical connection between the main supply 601 and the load 604 is interrupted. The load 604 may however be supplied with electrical energy by means of the energy storage system 605 in this case.

Undervoltage Detection

The above examples show that, in the event of a grid fault, this grid fault is able to be disconnected ("switched away") from the load by means of the respective interrupt switch. The respective energy storage system then thus supplies only the load and not the grid.

The respectively shown actuation unit is in this case configured such that an undervoltage in the supply is detected and the interrupt switch is tripped (that is to say opened) in response.

The undervoltage is preferably detected within a short time, for example in a few milliseconds or in a time that is shorter than the duration of a half-wave of the AC voltage. By way of example, the time to detect the undervoltage may be in a range between 1 ms and 2 ms.

A three-phase voltage measurement is performed for this purpose on the primary side on the interrupt switch (cf. the voltage measurements 207, 307, 407, 507 and 607 in FIGS. 2 to 6), that is to say the three voltages between in each case two of the three phases are measured.

For each of the three voltage measurements, monitoring is performed (preferably substantially simultaneously) as to whether the respective voltage reveals an undervoltage or a fault (that is to say deviation of the amplitude, phase position and/or harmonics).

The respective voltage measurements are thus monitored in accordance with an OR combination, that is to say as soon as one of the voltage measurements reveals an undervoltage or a significant fault, the interrupt switch may be tripped.

The "waiting time", after detection of the undervoltage, following which the interrupt switch is tripped (that is to say opened) is preferably able to be predefined, for example set. It is thus possible to set, depending on the installation, that for example brief voltage interruptions or brief undervoltages of a duration between 300 ms or up to 1 s do not lead to tripping of the interrupt switch, because these grid faults are able to be compensated by the time-limited overload capability of the inverter and the batteries in the energy store.

(At least) one of the following known approaches may be used to monitor and detect an undervoltage or a grid fault:

(1) Voltage drop detection as described in [N. S. Tunaboylu, A. Unsal: Basic analysis tools for power transient waveforms].

(2) Kalman filters and low-pass Butterworth filters as described in [I. Y. H. Gu, M. Bollen: Voltage dip detection and power system transients, IEEE conference paper, February 2001].

(3) DQ transformation and mathematical morphology filters as described in [O. Hua, B. Le-ping, Y Zhong-Lin: Voltage sag detection based on Dq transform and mathematical morphology filter. Procedia Engineering 23 (2011), 775-779].

(4) Voltage dip detection as described in [L. Dantas et al.: A robust and fast generic voltage sag detection technique. Proceedings of 2015 IEEE 13th Brazilian Power Electronics Conference and 1st Southern Power Electronics Conference (COBEP/SPEC), (pp. 1-6)].

(5) Weighted least-squares estimation by way of harmonic models as described in [H. Lei et al.: An Improved Method for Voltage Sag Detection Based on Weighted Least-Squares Estimation with Harmonic Models. PRZEGLAD ELEKTROTECHNICZNY (Electrical Review), ISSN 0033-2097, R.88 NR 10a/2012].

(6) Cumulative sum algorithm as described in [Isabel M. Moreno-Garcia et al.: Grid-Tied Smart Inverter Safety Functionality: Fast Power Quality Event Detection. Journal of Microelectronics, Electronic Components and Materials, vol. 45, no. 3 (2015), 204-215].

By way of example, it is possible to filter the harmonics occurring during normal operation out of the measured voltage signals in order thereby to conclude as to critical undervoltages or grid faults. Such filtering is described for example in more detail in:

(i) Y F Wang, Y W Li: Grid Synchronization PLL Based on Cascaded Delayed Signal Cancellation, IEEE TRANSACTIONS ON POWER ELECTRONICS VOL. 26, NO. 7, JULY 2011;

(ii) Y F Wang, Y W Li: Three-Phase Cascaded Delayed Signal Cancellation PLL for Fast Selective Harmonic Detection, IEEE TRANSACTIONS ON INDUSTRIAL ELECTRONICS, VOL. 60, NO. 4, APRIL 2013.

By way of example, the DQ transformation with cascaded, delayed signal cancellation according to the above-mentioned approach (3) may be combined with the methods described in (i) and (ii).

The approaches described in the above references may be implemented by way of microcontrollers or microprocessors.

By way of example, the calculation may take place based on measured values that have been determined at a sample rate of roughly 200 µs. It is also possible for sampling of the full period to be performed with $2^n$ sampling points. By way of example, 128 or 256 sampling points may be determined at 50 Hz or 60 Hz.

The measured values may preferably be recorded in two stages: by way of example, a measurement card samples analog raw measured values from the sensor with a cycle rate that lies above 5 kHz, and forms filtered values therefrom at a cycle rate of 5 kHz. These measured values are provided for real-time regulation (that operates for example at a sampling rate of 5 kHz) by the measurement card.

The solutions described above are in particular intended for a combination of
voltage measurement,
inductor and
interrupt switch,
an energy storage system (that is to say a voltage-supporting/energy bypass system) and
an actuation unit that trips the interrupt switch upon detecting a voltage problem, for example following a predefined (sufficient) duration.

Variants for the Interrupt Switch: LC Resonant Circuit

In one variant, an LC resonant circuit may be implemented instead of the choke. The LC resonant circuit in this case comprises a series circuit consisting of an inductor and a capacitor.

Figure 7:
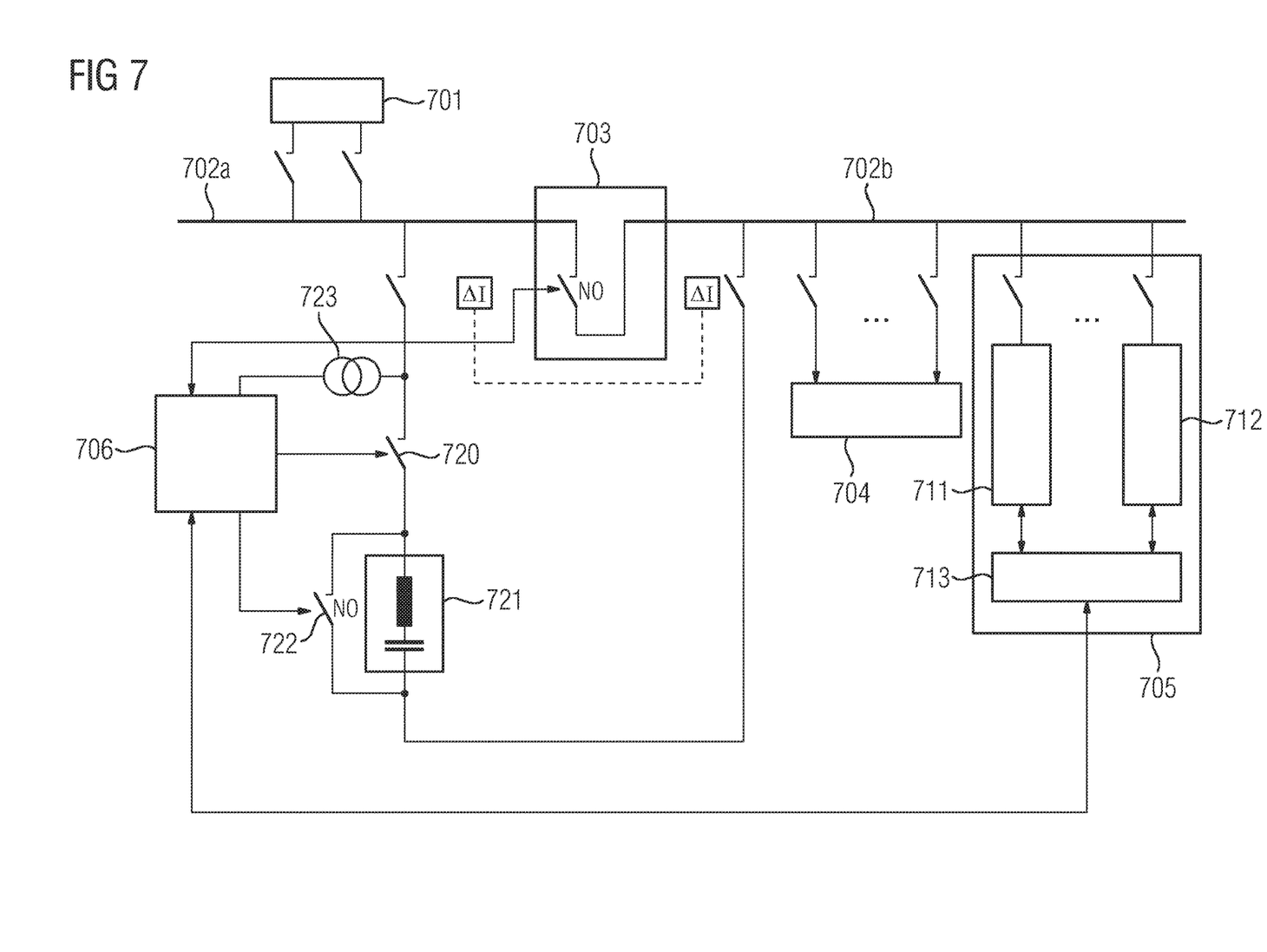
FIG. 7 shows an exemplary arrangement for a medium-voltage UPS having an LC resonant circuit.

FIG. 7 shows an exemplary arrangement for a medium-voltage UPS having an LC resonant circuit 721.

A main supply 701 (here for example redundant via two lines) is connected to a busbar 702a. The busbar 702a is able to be connected to a busbar 702b via a bypass circuit 703. The bypass circuit 703 has a (bypass) switch that is open (NO) during normal operation.

The busbar 702a and the busbar 702b are also referred to as single busbars.

The busbar 702a is connected to the busbar 702b via a series circuit consisting of a medium-voltage switch 720 and the LC resonant circuit 721. A load 704 and an energy storage system 705 are connected to the busbar 702b.

A bypass switch 722 is optionally arranged in parallel with the LC resonant circuit 721. Said bypass switch is normally open (NO). The bypass switch 722 may also be dispensed with.

The energy storage system 705 may have a multiplicity of energy storage subsystems 711, 712 that are connected to a control unit 713. Each of the energy storage subsystems 711, 712 is electrically connected (or able to be connected) to the load 704.

In the example shown in FIG. 7, each of the energy storage subsystems 711, 712 is connected to the busbar 702b.

It is noted here that all of the switches shown in FIG. 7 except for the switch of the bypass circuit 703 and the bypass switch 722 are normally closed (NC), that is to say without any other actuation.

An actuation unit 706 is electrically connected to the busbar 702a, and a voltage measurement 723 allows the actuation unit 706 to detect whether the main supply 701 should be disconnected from the load 704.

The actuation unit 706 furthermore has a communication connection to the control unit 713, and the actuation unit 706 may possibly activate or deactivate the bypass switch 722.

It is also an option for the actuation unit 706 to actuate the (normally open) switch of the bypass circuit 703. The LC resonant circuit and the medium-voltage switch 720 are thereby able to be bypassed for a predefined period of time.

The LC resonant circuit 721 may be tuned to 50 Hz in a 50 Hz medium-voltage grid and is therefore able to prevent rapid power changes. In particular in the case of grid short-circuits, the temporal current change is able to be limited by the resonant circuit 721. The LC resonant circuit 721 may furthermore be designed such that the impedance of its inductor corresponds roughly to the impedance of the load 704. The capacitor of the LC resonant circuit 721 is defined for example by tuning to the resonant frequency of 50 Hz.

The quality of the LC resonant circuit 721 limits or defines the possible rate of the current rise through the LC resonant circuit 721. The quality or the rate of the current rise are configured for example such that the settling time is around 1 s or a few seconds. The energy storage system 705 is thus additionally able to be used during normal operation (that is to say when no grid fault is present) for all "slow" grid services, such as primary power balancing, peak shaving, load control or temporal load shifting, etc. It is furthermore possible to recharge or to balance the energy storage system 705 during such normal operation without a grid fault.

In the event of a grid fault, the energy storage system 705 takes over the supply to the load 704. The medium-voltage switch 720 may be designed as normal (slow) medium-voltage switchgear, by way of which the main supply 701 is disconnected from the energy storage system 705 and the load 704 after one grid period or after a few grid periods.

If the energy storage system 705 is not in grid control operation, the actuation unit 706 (for example resulting from corresponding signaling by the control unit 713) is able to close the bypass circuit 703 and thus bypass the LC resonant circuit 721.

If the energy storage system 705 is not operational and if the LC resonant circuit 721 is not bypassed (that is to say the bypass circuit 703 is open), load surges may lead to voltage surges or voltage fluctuations at the load 704. By means of the connection between the control unit 713 and the actuation unit 706, the actuation unit 706 ascertains when the energy storage system 705 is operational again and is able to open the bypass switch 722 again.

If no grid fault is present, then the static power flow takes place from the main supply 701 to the load 704 via the LC resonant circuit 721 (the medium-voltage switch 720 is closed). The energy storage system 705 absorbs (positive and negative) load changes and harmonics. Losses of the energy storage system 705 are thereby low with regard to the nominal power or in comparison with a conventional UPS with double AC/DC energy conversion. By way of example, the losses of the LC resonant circuit are roughly 0.2%, and the losses of the energy storage system 705 are roughly 1.0%.

A generation unit, for example a diesel generator, may optionally in addition be connected to the busbar 702*b*.

It is also an option for the medium-voltage grid to be a 60 Hz grid.

The solution described here with an LC resonant circuit has the advantage that no additional expensive and error-prone power electronics are required. The LC resonant circuit itself is robust, with a comparatively inexpensive filter technology. It is furthermore advantageous that no switching procedures are generally tripped in the event of transient faults. Actual decoupling from the main supply, with the resultant grid faults such as overvoltages, thus occurs far less often. Additional grid services are therefore able to be provided in a more reliable manner.

One advantage is also that harmonics of the loads are hardly conducted at all to the grid side (in particular into the upstream high-voltage grid) due to the LC resonant circuit. The UPS installation proposed here thus makes a positive contribution to the grid quality.

Although the invention has been described and illustrated in more detail by the at least one exemplary embodiment that is shown, the invention is not restricted thereto and other variations may be derived therefrom by a person skilled in the art without departing from the scope of protection of the invention.

LIST OF REFERENCE SIGNS 101 main supply
102 interrupt switch
103 inductor (choke)
104 interrupt switch
105 bypass switch
106 output for connection of a critical load
107 coupling transformer
108 power converter
109 energy store
110 node
111 energy storage system
112 voltage measurement
113 control unit
114 interface
NO normally open switch
NC normally closed switch
201 main supply
202*a* busbar
202*b* busbar
203 bypass circuit
204 load
205 energy storage system
206 actuation unit
207 voltage measurement
208 voltage measurement (optional)
209 interrupt switch ("fast switch")
210 inductor (choke)
211 energy storage subsystem
212 energy storage subsystem
213 control unit (for the energy storage subsystems 211, 212)
301 busbar
401 main supply
402*a*1 busbar
402*a*2 busbar
402*b* busbar
402*c* busbar
403*a* bypass circuit
403*b* bypass circuit
404*a* load
404*b* load
405 energy storage system
406 actuation unit
407 voltage measurement
408 voltage measurement (optional)
409 interrupt switch ("fast switch")
410 inductor (choke)
411 energy storage subsystem
412 energy storage subsystem
413 control unit (for the energy storage subsystems 411, 412)
414*a* busbar
414*b* busbar
415 switch (NC)
501 main supply
502*a*1 busbar
502*a*2 busbar
502*b*1 busbar
502*b*2 busbar
503 bypass circuit
504 load
505 energy storage system
506 actuation unit
507 voltage measurement
508 voltage measurement (optional)
509 interrupt switch ("fast switch")
510 inductor (choke)
511 energy storage subsystem
512 energy storage subsystem
513 control unit (for the energy storage subsystems 511, 512)
514*a* busbar
514*b* busbar
601 main supply
602*a*1 busbar
602*a*2 busbar 602b1 busbar
602b2 busbar
603 bypass circuit
604 load
605 energy storage system
606 actuation unit
607 voltage measurement
608 voltage measurement (optional)
609 interrupt switch ("fast switch")
610 inductor (choke)
611 energy storage subsystem
612 energy storage subsystem
613 control unit (for the energy storage subsystems 611, 612)
614a busbar
614b busbar
701 main supply
702a busbar
702b busbar
703 bypass circuit
704 load
705 energy storage system
706 actuation unit
711 energy storage subsystem
712 energy storage subsystem
713 control unit (for the energy storage subsystems 711, 712)
720 medium-voltage switch
721 LC resonant circuit
722 bypass switch (of the LC resonant circuit 721)
723 voltage measurement

The invention claimed is:

1. An uninterruptible power supply for a three-phase AC voltage grid, the uninterruptible power supply comprising:
    an LC resonant circuit connected between an AC voltage grid supply and a load, said LC resonant circuit being formed with a series circuit having an inductor and a capacitor;
    a switch connected in series with said LC resonant circuit to form a series circuit;
    an actuation unit for actuating said switch;
    said series circuit of said switch and said LC resonant circuit being connected between the grid supply and a node between said series circuit and the load; and
    an energy storage system connected to said node and in parallel with said LC resonant circuit, said energy storage system including a DC voltage energy storage device and an energy converter connected between said node and said DC voltage energy storage device to convert a DC voltage from the DC voltage energy storage device into an AC voltage and vice versa,
    wherein the energy storage system further includes a control unit and a voltage measurement so that the control unit is able to detect a voltage at input of the energy storage system via the voltage measurement.

2. The uninterruptible power supply according to claim 1, wherein said actuation unit is configured to detect a grid fault with the grid supply via a current measurement or voltage measurement and to open said switch in response to a grid fault.

3. The uninterruptible power supply according to claim 1, further comprising a bypass switch connected in parallel with said LC resonant circuit, said bypass switch being configured for actuation by said actuation unit or by said energy storage system.

4. The uninterruptible power supply according to claim 3, wherein said bypass switch is closed when said energy storage system is not operational.

5. The uninterruptible power supply according to claim 3, wherein said bypass switch is a medium-voltage switch.

6. The uninterruptible power supply according to claim 1, wherein a resonant frequency of said LC resonant circuit is determined by a frequency of said grid supply.

7. The uninterruptible power supply according to claim 6, wherein the resonant frequency of said LC resonant circuit is 50 Hz or 60 Hz.

8. The uninterruptible power supply according to claim 1, wherein a quality of said LC resonant circuit is configured to have a settling time of the LC resonant circuit of substantially one second.

9. The uninterruptible power supply according to claim 1, wherein a quality of said LC resonant circuit is configured to have a settling time of the LC resonant circuit in a range between 1 second and 10 seconds.

10. The uninterruptible power supply according to claim 1, wherein said switch is a medium-voltage switch.

11. The uninterruptible power supply according to claim 1, configured for a medium-voltage grid.

12. The uninterruptible power supply according to claim 11, wherein the medium-voltage grid is a three-phase grid, with each of the phases having a voltage of at least 1000 volts.

13. The uninterruptible power supply according to claim 12, wherein each of the phases of the medium-voltage grid has a voltage in a range between 1 kV and 52 kV.

14. A method of operating an uninterruptible power supply in a three-phase AC voltage grid, which comprises:
    during normal operation, operating a load via a grid supply that is connected to the load via a series circuit consisting of an LC resonant circuit and a switch, with the LC resonant circuit having a series circuit consisting of an inductor and a capacitor;
    during the normal operation, supporting a voltage carried via the series circuit by regulating a voltage of an energy storage system connected in parallel with the series circuit to a normal voltage and injecting the voltage of the energy storage system into the series circuit, wherein the energy storage system includes a DC voltage energy storage device and an energy converter to convert a DC voltage from the DC voltage energy storage device into an AC voltage and vice versa, and wherein the energy storage system further includes a control unit and a voltage measurement so that the control unit is able to detect a voltage at input of the energy storage system via the voltage measurement; and
    in the event of a grid fault, disconnecting the grid supply from the load by opening the switch with an actuation unit, and operating the load via the energy storage system.

15. The method according to claim 14, configured for a three-phase AC voltage grid being a medium-voltage grid.

16. A non-transitory computer program product with code to be loaded directly into a memory of a digital computer, comprising program code portions that are configured for performing steps of the method according to claim 14.

17. The uninterruptible power supply according to claim 1, wherein the control unit is directly connected to at least one of the DC voltage energy storage device and the energy converter.

18. The method according to claim 14, wherein the control unit is directly connected to at least one of the DC voltage energy storage device and the energy converter.

\* \* \* \* \*